Patented Nov. 2, 1937

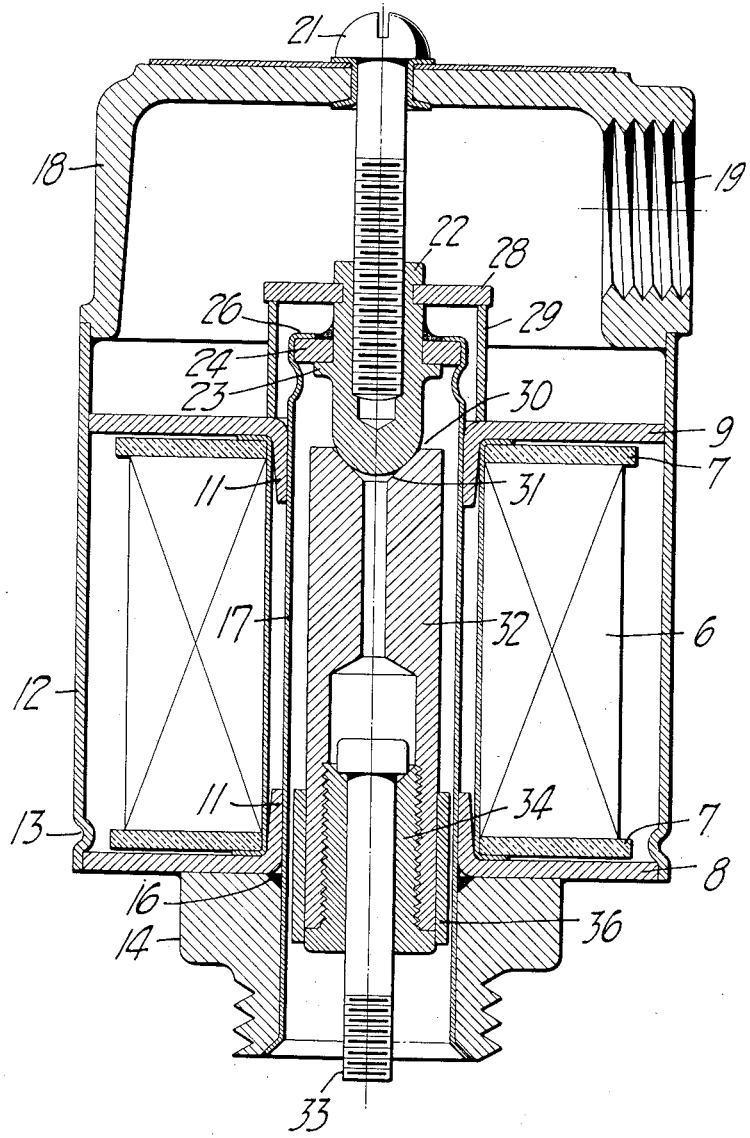

2,098,197

UNITED STATES PATENT OFFICE 2,098,197

SOLENOID

William A. Ray, San Francisco, Calif., assignor to General Controls Company, a corporation of California Application November 20, 1936, Serial No. 111,891

3 Claims. (Cl. 175—338)

This is a continuation in part of my application Serial No. 92,748 filed July 27, 1936.

The present invention relates to a solenoid, particularly one useful upon alternating current.

It is in general the broad object of the present invention to provide a suitable solenoid which, when operated upon alternating current, does not stick when the current is cut off and, while the current is on, does not hum.

Another object of the present invention is to provide a solenoid which is quiet and non-sticking, and which is just as useful upon low frequency alternating current, particularly 25 and 50 cycle.

The invention includes other objects and features of advantage, some of which will appear hereinafter, wherein the present preferred form of the invention has been disclosed.

In the drawing accompanying and forming a part hereof, the single figure is a section through the structure embodying the invention.

As appears in the drawing, I provide a suitable field coil 6. This coil is manufactured in a manner well known in the art. The final coil is assembled between fiber washers 7.

The field coil and the fiber washers are apertured to provide a central passage through which a solenoid plunger is movable. At the ends of the field coil I position magnetic washers 8 and 9. Each of these washers includes a portion thereof turned in along the passage, this turned in portion being indicated by numeral 11. About the field coils I position a suitable magnetic housing 12, the housing engaging the washers 8 and 9 and being suitably secured thereto as by being deformed as at 13.

A base structure, indicated generally at 14, permitting ready attachment of the device, is secured to a non-magnetic tube 17 by soldering, as at 16, and by deforming outwardly at the lower side of the base structure at the lower end of tube 17. Fitting upon the upper end of the casing 12 is a non-magnetic cap 18 having an opening 19 for a conduit serving as a lead-in for wires connected to the field coil 6. This cap is secured in place by a non-magnetic screw 21, which extends through the cap and engages a magnetic stop member threaded to receive it, the stop member being indicated by numeral 22. Stop member 22 includes a shoulder 23 thereon which brings the member to rest against a non-magnetic washer 24 positioned between the shoulder 23 and the crimped over end 26 of non-magnetic tube 17.

Mounted upon an end of the stop member is a magnetic washer 28, while between the washer 28 and washer 9 is positioned a non-magnetic ring 29. Parts 28 and 29 should be different in that if one is magnetic the other should be non-magnetic, so 28 can also be non-magnetic and 29 magnetic.

It is to be noted that stop member 22 is positioned on the axis of the passage through the field coil, and that it extends above and below washer 9 while non-magnetic member 24 is intermediate of the ends of the stop member and is positioned about the stop member so that it will interrupt current flow therethrough and provide two different flux paths, one out of phase with the other. Stop member 22 is also of relatively small cross section, and of small mass. This is secured by threading it to receive screw 21, which is made of non-magnetic material, such as brass. The end of the stop member is preferably made in a semi-spherical shape to be received in co-operating end 30 of plunger 32. Plunger 32 is hollowed out as at 31 to receive the end of the stop member and center it. The semi-spherical end on the stop member can be provided on the plunger, the stop member being hollowed out to receive the plunger. This is merely a reversal in the position of the parts.

Plunger 32 is preferably made of a magnetic material, such as iron, and of a length sufficient to bridge the distance between the magnetic washers 8 and 9 when it is pulled into the field coil upon energization thereof. The plunger is hollowed out adjacent its lower end.

A screw 33 is inserted into the plunger to enable attachment to be made to some other device to be operated, such as a valve. The screw is maintained in place by an insert 34. Screw 33 and insert 34 are usually made of materials having considerable wear resistance and toughness such as a stainless steel. The head of screw 33 pounds on the insert with each rising of the plunger, and it is therefore necessary to make these parts of relatively tough material. Whether or not the materials are non-magnetic or magnetic is a matter of no importance so far as operation of the device is concerned.

To provide for accurate centering of the bottom of the plunger, and to enable a structure to be readily manufactured which does not involve mechanical centering means, I preferably position about the plunger adjacent its lower end a non-magnetic ring 36. This ring is placed on the plunger at a point substantially corresponding to that opposite the washer 8 when the plunger is in its raised position so that flux lines from the washer are dissipated and spread about the plunger so that a lack of symmetry in any of the structure adjacent this end of the plunger does not cause vibration and thus give rise to humming in the device.

The structure disclosed has proven particularly useful upon low frequency alternating current, particularly the 25 and 50 cycle currents, although it can also be used successfully upon the ordinary 60 cycle alternating current. Many solenoids useful on 60 cycle current are not successful at the lower frequencies.

I claim:

1. In a device of the character described, a solenoid plunger, a pair of spaced magnetic members, each member having an opening therein, a coil positioned between said members, said coil having a passage therethrough aligned with said opening in each member to provide a passage for said plunger, a stop member of magnetic material, means supporting said stop member in a fixed position and spaced from one of said pair of members at one end of said passage and projecting from above said one of said pair of members into said passage to adjacent the plane of said one of said pair of members, said plunger including a magnetic member providing a primary magnetic circuit and of a length sufficient substantially to bridge said pair of spaced magnetic members when said plunger is pulled into said passage, said plunger being hollowed out to receive and engage said stop member below that end of said plunger adjacent said stop, a first non-magnetic sleeve member positioned on and surrounding an intermediate portion only of said stop member above said magnetic members to shield a portion of said stop member to provide a secondary magnetic circuit, and a second non-magnetic sleeve member secured on said plunger on that portion of said plunger adjacent the other of said pair of members when said plunger is pulled into said passage to distribute more evenly flux from said other of said pair of members and maintain said plunger in a single position in said passage whereby humming is absent.

2. In a device of the character described, a solenoid plunger, a pair of spaced magnetic members, each member having an opening therein with a portion thereof turned inwardly toward the other member, a coil positioned between said members, said coil having a passage therethrough aligned with said opening in each member to provide a passage for said plunger, a stop member of magnetic material, means supporting said stop member in a fixed position and spaced from one of said pair of members at one end of said passage and projecting from above said one of said pair of members into said passage to adjacent the plane of said one of said pair of members, said plunger including a magnetic member providing a primary magnetic circuit and of a length sufficient substantially to bridge said pair of spaced magnetic members when said plunger is pulled into said passage, said plunger being hollowed out to receive and engage said stop member below that end of said plunger adjacent said stop, a first non-magnetic sleeve member positioned on and surrounding an intermediate portion only of said stop member above said magnetic members to shield a portion of said stop member to provide a secondary magnetic circuit and a second non-magnetic sleeve member secured on that portion of said plunger adjacent to the other of said pair of members when said plunger is pulled into said passage to distribute more evenly flux from said other of said pair of members and maintain such plunger in a single position in said passage whereby humming is absent.

3. In a device of the character described, a coil having a passage therethrough, a magnetic member at each end of said coil and apertured in alignment with said passage, a plunger including a magnetic member movable as a plunger in said passage and of a length substantially sufficient to extend between said magnetic members at the coil ends to provide a primary path for a primary magnetic flux during energization of said coil, a stop of magnetic material cooperating with said plunger and engaged by an end of said plunger upon energization of said coil to retain said end against movement transverse to the axis of said passage, and means positioning said stop at an end of said passage to hold stop and provide a secondary path for a secondary magnetic flux upon energization of said coil substantially out of phase with said primary flux, said positioning means including a tube extending between and beyond said magnetic members at one end of said passage, a non-magnetic washer positioned on and secured to said stop intermediate the ends thereof, said tube supporting said non-magnetic washer, a non-magnetic collar surrounding the exterior of said tube and said non-magnetic washer, and spaced therefrom, and a magnetic washer engaged with and carried by said stop adjacent an end thereof, said magnetic washer being supported by said collar in spaced relation to that magnetic member at the adjacent end of said coil.

WILLIAM A. RAY.